June 12, 1923.
J. T. RICE ET AL
1,458,150
ANTIFRICTION ROLLER BEARING
Filed July 22, 1920
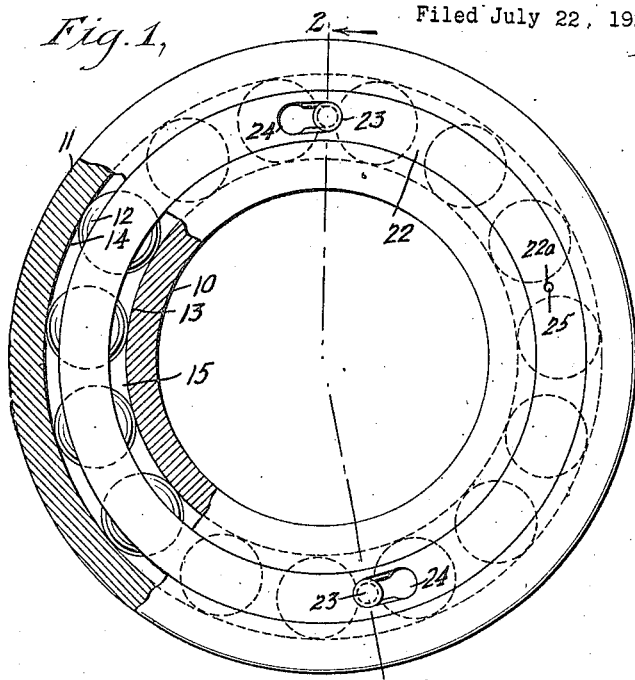
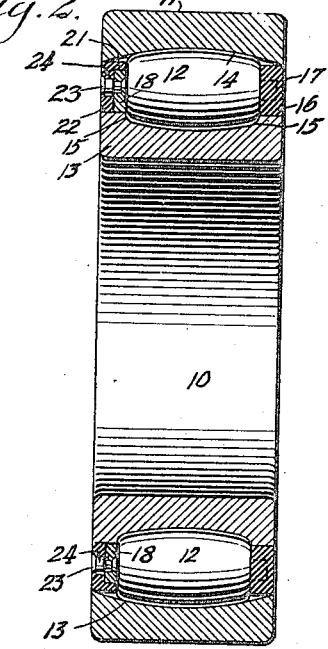
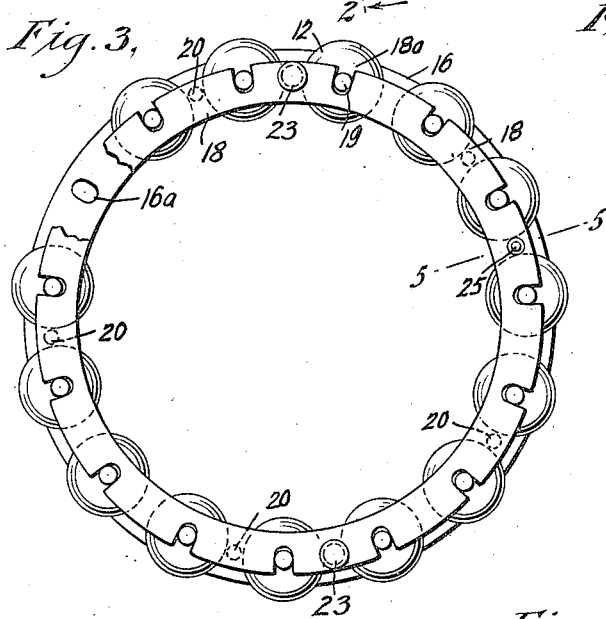
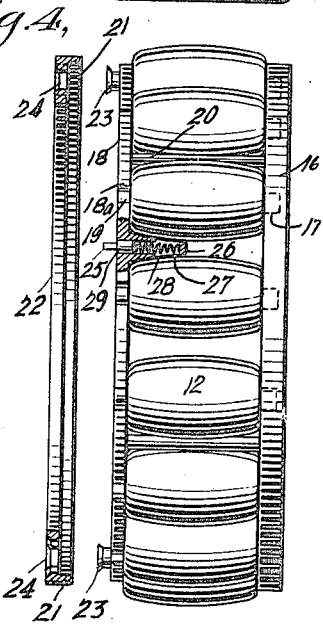
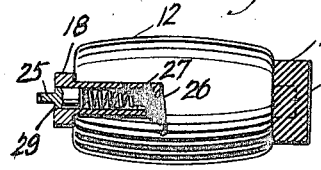
WITNESSES
INVENTORS
JOEL T. RICE
ROYAL A RICE
JOEL A RICE
BY
ATTORNEYS Patented June 12, 1923.

1,458,150

UNITED STATES PATENT OFFICE.

JOEL TROUT RICE, ROYAL A. RICE AND JOEL A. RICE, OF NEW YORK, N. Y.

ANTIFRICTION ROLLER BEARING.

Application filed July 22, 1920. Serial No. 398,103.

*To all whom it may concern:*

Be it known that we, JOEL T. RICE, ROYAL A. RICE, and JOEL A. RICE, citizens of the United States, and residents of the city of New York, borough of the Bronx, in the county of Bronx and State of New York, have invented a new and Improved Antifriction Roller Bearing, of which the following is a description.

Our invention relates to roller bearings involving inner and outer rings forming the race for the rollers and more particularly is intended as an improvement on the bearing forming the subject matter of United States Letters Patent, granted to us May 9, 1920, Number 1,338,868.

The general object of the invention is to provide a bearing of the type shown in the patent referred to and improved in various particulars with a view to provide a construction that will prevent the entrance of dirt to the rollers and race for the latter or at all events to minimize the entrance of dirt especially having in view the possible positions of the parts when the shaft in connection with which the bearing is employed is disposed with its axis at an angle to the axis of the bearing, thereby tilting the inner ring of the bearing relatively to the outer ring as well as to provide a construction making for facility in the assembling and disassembling of the parts.

Other objects of the invention as well as its distinctive features and advantages will clearly appear as the description proceeds.

Reference is to be had to the accompanying drawings forming a part of this specification, it being understood that the drawings are merely illustrative of one example of the invention.

Figure 1 is a face view of a bearing embodying our invention shown partly broken away and in section;

Figure 2 is a transverse vertical section as indicated by the line 2—2, Figure 1;

Figure 3 is an elevation of the roller cage or carrier and the rollers, part being broken away and one of the rollers being omitted;

Figure 4 is a partly sectional end view of the cage and rollers, one of the ring elements being shown separated and in transverse section;

Figure 5 is a cross section on the line 5—5, Figure 3.

In carrying out our invention in accordance with the illustrated example an inner bearing ring 10 is employed and an outer concentric bearing ring 11, said rings presenting respectively bearing surfaces 13, 14, whereby the two rings form a race for the rollers 12 therebetween. The surfaces 13 at the end are directed approximately radially outward on curved lines as at 15 to conform to the end surfaces of the rollers as in the patent referred to. The foregoing parts correspond generally with similar parts in our patented bearing mentioned above.

In accordance with the present invention we employ a unitary ring 16 presenting an annular series of depressions or recesses $16^a$ in the inner face thereof to receive the adjacent journals 17 on the rollers 12, said recesses $16^a$ being advantageously oblong and the major axes disposed radially, the arrangement serving to facilitate the entrance and the removal of the journals 17 and taking care of wear on the rollers 12. At the opposite ends of the rollers a composite ring is employed comprising an inner ring element 18 having radial slots $18^a$ in the outer periphery to receive the journals 19 on the adjacent ends of the rollers 12. The ring 16 and ring element 18 are rigidly united by connecting transverse bars or girts 20 so that they constitute a cage for the rollers. The ring element 18 is smaller in diameter than the ring 16 and is accommodated at the inner face of an associated outer ring element 22 of an external diameter corresponding with the interior ring 16. Thus, the two ring elements 18, 22 when assembled into a composite ring correspond with the ring 16 as to the external and internal diameters. The said outer ring element 22 has at the outer periphery thereof an annular flange 21 which is directed laterally inward over the ring element 18 to thereby close the radial slots $18^a$ thereby holding the adjacent journals 19 against displacement. The slots $16^a$ and $18^a$ have radial dimensions such that the journals will not rest against the inner and outer ends of the slots since the bearing contact will be between the rollers 12 and the surfaces 13, 14, said slots ($16^a$, $18^a$) being, however, of a width to prevent play of the rollers annularly of the ring 16 and ring element 18.

The described arrangement effectively maintains the rollers in parallel relation while permitting of their accommodating themselves to wear on the rollers and bearing surfaces.

In order to detachably fasten the ring element 22 to element 18 we provide headed studs 23 on the inner ring element 18 projecting laterally outward therefrom, said studs being adapted to coact with keyhole slots 24 in outer element 22. Thus, the ring element 22 may be placed on the ring element 18, the heads of the studs 23 passing through the enlarged ends of the keyhole slots 24 and a relative turning of said elements to positions shown in Figure 1 will bring the shanks of said studs 23 into the narrow portions of said slots 24, thereby holding the ring elements 18, 22 together. The narrow portions of the slots 24 are dovetail and the heads of the several studs 23 are correspondingly bevelled.

For locking the ring elements 18, 22 against relative turning movement we provide a latch pin 25 disposed transversely on the element 18 and movable axially in a housing 26 on said element, said housing accommodating a compression spring 27 normally tending to project the pin 25 beyond the face of element 18 so as to engage in a latch-pin hole 22ª in the outer ring element 22. The pin 25 is formed of two diameters to present an outwardly facing shoulder 29 for contacting with the inner face of the outer ring element 22 and limiting the outward movement of the pin so that it will lie flush at the outer face of ring element 22. The housing 26 and the bore thereof accommodating the pin 25 are utilized as an oiler by producing a lateral opening or openings 28 so that by depressing the pin 25 against the pressure of the spring 27, oil may be passed into the housing and escape laterally into the roller race.

It is to be observed that the united unitary ring 16 and the composite ring composed of ring elements 18, 22, are snugly accommodated between the inner and outer bearing rings 10, 11 and lie flush or approximately so with the faces of said rings 10, 11. The bearing surfaces 13, 14 of the rings 10, 11 curve transversely, the peripheral surface of the rollers presenting a corresponding curvature longitudinally of the rollers, that is, transversely of the bearing, so that the inner ring 10 with the rollers and roller cage may take a position with the axis thereof at an angle to the axis of the outer ring 11. Thus, in the event the shaft (not shown) to which the bearing is applied should be disposed at a slight angle to the general axis of the bearing, the ring 10 with the rollers 12, and the described roller cage can accommodate itself to the position of the shaft and tilt relatively to the axis of the outer ring 11. The inner and outer diameters of the unitary ring 16 and composite ring 18, 22, are such as to cause the united structure to snugly fill the annular space between the inner and outer rings 10, 11 and as the one ring, 16 for example, moves laterally outward beyond the adjacent face of the ring 11 and the composite ring (18, 22) at the opposite side moves laterally inward relatively to the adjacent face of the ring 11 a minimum opening will be presented between the structure comprising ring elements 16, 18, 22, and the rings 10, 11, thereby excluding or minimizing the entrance of dirt to the rollers and race. It will be readily understood that a material angular movement of the shaft at a point distant from the bearing will be possible with the axes of the rings 10, 11 disposed at but a slight angle and with the rings 16, and 18, 22 remaining partially within the rings 10, 11 and therefore in position to exclude dirt.

In practice in assembling the bearing, the ring 10 with the unitary ring 16 and ring element 18 thereon, is placed in the outer ring 11 and disposed in a plane at right angles to the plane of said ring 11. The rollers are then placed in position in single succession and the whole turned into the plane of the ring 11 whereupon the outer ring element 22 may be applied to the element 18 and fastened through the medium of the studs 23 and latch pin 25. To disassemble the parts the latch pin 25 is depressed with any convenient tool or implement until it is disengaged from the ring element 22, whereupon the latter may be given a partial turn relatively to the element 18 for the separation of said elements.

We would state in conclusion that while the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim:

1. A roller bearing including inner and outer bearing rings forming an annular race, an annular series of rollers in said race and a cage carrying said rollers and disposed between said bearing rings, said cage comprising rings at opposite sides of the bearing, one of said cage rings being unitary and affording bearings for the rollers at one end, the other of said cage rings being composite and composed of separate inner and outer ring elements, the inner one of which is rigid with said first-mentioned cage ring and presents radial slots in which the adjacent ends of said rollers are journaled, while the outer ring element of the composite ring accommodates said radially slotted element, said composite ring corresponding as to its inner and outer peripheries with said unitary ring, there being means to detachably fasten the inner and outer ring elements of the composite ring together.

2. A roller bearing including inner and outer bearing rings presenting transversely curved bearing surfaces and forming a roller race, an annular series of rollers in said race and curved to correspond with said bearing surfaces, and a cage comprising a ring at one side of the bearing in which the rollers at one end thereof have bearings, a ring element at the opposite side of the bearing rigid with the ring at the first-mentioned side and presenting bearings for the adjacent ends of the rollers, and a ring element at the outer side of said rigid ring element and forming therewith a composite ring, said composite ring corresponding as to its inner and outer peripheries with the first-mentioned cage ring to be accommodated with the latter between the bearing rings; together with means to detachably fasten said outer ring element to the rigid ring element, said fastening means comprising studs on one of said ring elements and keyhole slots in the other of said ring elements to receive said studs, the slots being so disposed as to effect engagement or disengagement of the studs by a relative turning movement of the ring elements, there being a spring-pressed latch pin on the inner of said ring elements disposed laterally outward, the outer ring element having a latch-pin hole to receive said latch pin.

3. A roller bearing including inner and outer bearing rings forming an annular race, an annular series of rollers in said race, and a cage carrying said rollers and disposed between said bearing rings, said cage comprising rings at opposite sides of the bearing, one of which presents bearings for the journals at the adjacent ends of the rollers, the other of said cage rings being composite and composed of separate inner and outer ring elements, the inner one of which is rigid with the first-mentioned cage ring and presents radial slots extending to the outer periphery for receiving the journals on the adjacent ends of the rollers, said inner ring element being of less diameter than the cage ring at the opposite side, said outer ring element presenting a radial flange directed laterally inward to fit over said inner ring element and close the slots therein.

4. A roller bearing including inner and outer bearing rings forming an annular race, an annular series of rollers in said race, and a cage carrying said rollers and disposed between said bearing rings, said cage comprising rings at opposite sides of the bearings, one of which presents bearings for the journals at the adjacent ends of the rollers, the other of said cage rings being composite and composed of separate inner and outer ring elements, the inner one of which is rigid with the first-mentioned cage ring and presents radial slots extending to the outer periphery for receiving the journals on the adjacent ends of the rollers, said inner ring element being of less diameter than the cage ring at the opposite side, said outer ring element presenting a radial flange directed laterally inward to fit over said inner ring element and close the slots therein; together with means to detachably fasten said inner and outer ring elements together.

JOEL TROUT RICE.
ROYAL A. RICE.
JOEL A. RICE.